United States Patent
Koo

(10) Patent No.: US 11,352,921 B2
(45) Date of Patent: Jun. 7, 2022

(54) DEVICE AND METHOD FOR DIAGNOSING POSITIVE CRANKCASE VENTILATION BREATHER LINE

(71) Applicants: HYUNDAI MOTOR COMPANY, Seoul (KR); KIA MOTORS CORPORATION, Seoul (KR)

(72) Inventor: Bon Chang Koo, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 78 days.

(21) Appl. No.: 16/870,291

(22) Filed: May 8, 2020

(65) Prior Publication Data
US 2021/0180485 A1 Jun. 17, 2021

(30) Foreign Application Priority Data
Dec. 12, 2019 (KR) .......................... 10-2019-0165927

(51) Int. Cl.
*G01M 15/09* (2006.01)
*F01M 13/00* (2006.01)

(52) U.S. Cl.
CPC ........ *F01M 13/0011* (2013.01); *G01M 15/09* (2013.01); *F01M 2250/00* (2013.01)

(58) Field of Classification Search
CPC .............. F01M 13/00; F01M 13/0011; F01M 2250/00; G01M 15/09
See application file for complete search history.

(56) References Cited

U.S. PATENT DOCUMENTS

| 10,767,590 B1 * | 9/2020 | Jentz | G07C 5/0808 |
| 10,871,129 B1 * | 12/2020 | Jentz | F01M 1/20 |
| 2014/0081550 A1 * | 3/2014 | Jentz | F01M 1/18 |
| | | | 701/101 |
| 2014/0081564 A1 * | 3/2014 | Pursifull | G01M 15/08 |
| | | | 701/113 |
| 2014/0290241 A1 * | 10/2014 | Shin | F01M 13/028 |
| | | | 60/605.1 |
| 2015/0059719 A1 * | 3/2015 | Bidner | F01M 13/02 |
| | | | 123/574 |
| 2017/0256103 A1 * | 9/2017 | Wang | G07C 5/0841 |
| 2019/0085742 A1 * | 3/2019 | Mitambo | F01M 13/04 |

* cited by examiner

*Primary Examiner* — Eric S. McCall
(74) *Attorney, Agent, or Firm* — Lempia Summerfield Katz LLC

(57) ABSTRACT

A device and a method for diagnosing a positive crankcase ventilation (PCV) breather line. The device includes: a crankcase pressure sensor that is installed on the PCV breather line including a front end connected to an intake line and a rear end connected to a crankcase and detects a pressure inside the crankcase; and a processor that diagnoses an abnormality of the PCV breather line based on the pressure of the crankcase.

12 Claims, 7 Drawing Sheets

DEVICE AND METHOD FOR DIAGNOSING POSITIVE CRANKCASE VENTILATION BREATHER LINE

CROSS-REFERENCE TO RELATED APPLICATION

This application claims priority to and the benefit of Korean Patent Application No. 10-2019-0165927, filed on Dec. 12, 2019, the entire contents of which are incorporated herein by reference.

FIELD

The present disclosure relates to a device and a method for diagnosing a positive crankcase ventilation (PCV) breather line.

BACKGROUND

The statements in this section merely provide background information related to the present disclosure and may not constitute prior art.

A positive crankcase ventilation (PCV) system connects a breather hose, which is a ventilation pipe, to an air cleaner or an intake manifold to forcibly vent and re-burn air polluting gas and the like generated in the crankcase. In such a conventional PCV system, we have discovered that a structure of the breather line is complicated, so that an abnormality of the breather line may not be able to be diagnosed using a MAP sensor (an intake pressure sensor) mounted on an engine.

SUMMARY

An aspect of the present disclosure provides a system and a method for diagnosing a PCV breather line that diagnose an abnormality of a connection portion of the PCV (Positive Crankcase Ventilation) breather line using a crankcase pressure sensor.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for diagnosing a positive crankcase ventilation (PCV) breather line includes: a crankcase pressure sensor installed on the PCV breather line including a front end connected to an intake line and a rear end connected to a crankcase and configured to detect a pressure inside of the crankcase; and a processor that diagnoses an abnormality of the PCV breather line based on the detected pressure of the crankcase.

In one form, the processor may determine whether to activate a diagnosis mode based on a boost pressure, a cooling water temperature, a barometric pressure, and an engine state.

In one form, the processor may determine to activate a diagnosis mode of the rear end of the PCV breather line when the engine state is a cranking state.

In one form, the processor may calculate a negative pressure accumulated value and a positive pressure accumulated value of the crankcase based on the detected pressure of the crankcase and compare the negative and positive pressure accumulated values with each other, and determine that the rear end of the PCV breather line is abnormal when a negative pressure is not formed as the result of the comparison.

In one form, the processor may determine to activate a diagnosis mode of the front end of the PCV breather line when the engine state is a running state.

In one form, the processor may calculate a current negative pressure accumulated value of the crankcase based on the detected pressure of the crankcase when an accelerator pedal position change rate is equal to or greater than a reference change rate, and determine that the front end of the PCV breather line is abnormal when a ratio of the current negative pressure accumulated value to a predetermined reference value is equal to or less than a reference ratio.

According to an aspect of the present disclosure, a method for diagnosing a positive crankcase ventilation (PCV) breather line by a device for diagnosing the PCV breather line is provided. In particular, the device include: a pressure sensor installed on the PCV breather line having a front end connected to an intake line and a rear end connected to a crankcase, and a processor to diagnose the PCV breather line. In one form, the method for diagnosing the PCV breather line includes: detecting, by the pressure sensor, a pressure inside of the crankcase; and diagnosing, by the processor, an abnormality of the PCV breather line based on the detected pressure of the crankcase.

In one form, the method further includes: determining, by the processor, whether to activate a diagnosis mode based on a boost pressure, a cooling water temperature, a barometric pressure, and an engine state.

In one form, the determining whether to activate the diagnosis mode may include determining to activate a diagnosis mode of a rear end of the PCV breather line when the engine state is a cranking state.

In one form, the diagnosing of the abnormality of the PCV breather line may include: calculating a negative pressure accumulated value and a positive pressure accumulated value of the crankcase based on the detected pressure of the crankcase after the diagnosis mode of the rear end is activated, comparing the negative and positive pressure accumulated values with each other to determine whether a negative pressure is formed on the PCV breather line, and determining whether the rear end of the PCV breather line is abnormal based on the negative pressure is formed on the PCV breather line.

In one form, the determining of whether the rear end of the PCV breather line is abnormal may include determining that the rear end of the PCV breather line is abnormal when the negative pressure is not formed.

In one form, the determining whether to activate the diagnosis mode may include: determining to activate a diagnosis mode of a front end of the PCV breather line when the engine state is a running state.

In one form, the diagnosing of the abnormality of the PCV breather line may include: calculating a current negative pressure accumulated value of the crankcase based on the detected pressure of the crankcase when an accelerator pedal position change rate is equal to or greater than a reference change rate; determining the current negative pressure accumulated value as a current pressure accumulated value; and determining whether a ratio of the current pressure accumulated value to a predetermined reference value is equal to or less than a reference ratio to determine whether the front end of the PCV breather line is abnormal.

In one form, the method further includes determining that the front end of the breather line is abnormal when the ratio of the current pressure accumulated value to the predetermined reference value is equal to or less than the reference ratio.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
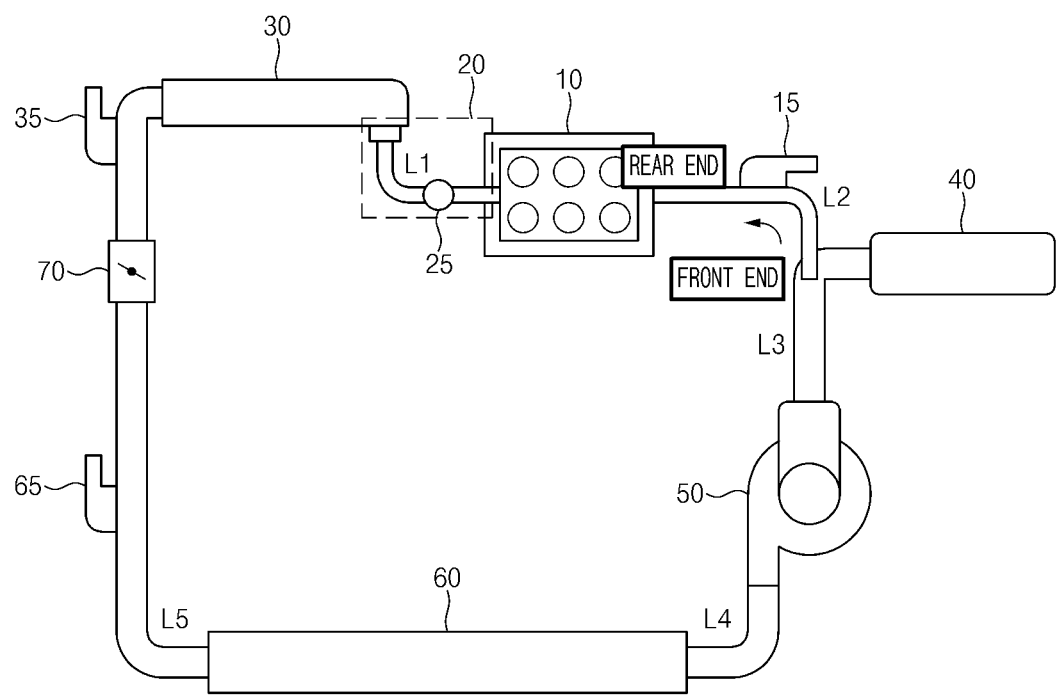
FIG. 1 is a block diagram illustrating a crankcase ventilation system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the form of the present disclosure, a detailed description of the related known configuration or function will be omitted when it is determined that it interferes with the understanding of the form of the present disclosure.

In describing the components of the form according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure relates to a technology for diagnosing an abnormality of a connection portion of a breather line connected to an intake line (an intake hose) and a head cover using a crankcase pressure sensor (CKCPS).

FIG. 1 is a block diagram illustrating a crankcase ventilation system associated with the present disclosure.

Referring to FIG. 1, the crankcase ventilation system includes: a crankcase 10, a head cover 20, a surge tank 30, an air cleaner 40, a compressor 50, an inter cooler 60, and an electronic throttle control (ETC) 70.

The crankcase 10, which is a space in which a crankshaft is installed in a cylinder block below a cylinder, is connected to the head cover 20. A PCV line L1 equipped with a positive crankcase ventilation (PCV) valve 25 is embedded in the head cover 20 so as not to be exposed to the outside.

A breather line L2 allows air to enter and exit the crankcase 10. The breather line L2 is a structure that is exposed to the outside. A front end of the breather line L2 is connected to an intake line L3 and a rear end thereof is connected to the crankcase 10. In this connection, the front end and the rear end of the breather line L2 may be fixed with a clip.

A crankcase pressure (CKCP) sensor 15 is installed on the rear end of the breather line L2. The crankcase pressure sensor 15 measures an internal pressure of the crankcase 10.

The surge tank 30 is a space located between the electronic throttle control 70 and an intake manifold and stores air inflowed through intake lines L3 to L5 therein temporarily. The surge tank 30 supplies intake air to each cylinder of an engine through the intake manifold. A manifold absolute pressure (MAP) sensor 35 is installed at a front end of the surge tank 30. The MAP sensor 35 is a sensor that detects a pressure of the air flowed into the engine, that is, an intake air pressure. A processor 170 may determine a load state of the engine by sensing a pressure change of the intake manifold through the MAP sensor 35, and may indirectly measure an intake air amount.

The air cleaner 40, the compressor 50, the inter cooler 60, and the electronic throttle control 70 are installed on the intake lines L3 to L5.

The air cleaner 40 removes (filters) foreign substances such as dust contained in the air inflowed from the outside. The air cleaner 40 supplies the filtered air to the compressor 50. An air flow sensor (AFS) for measuring an amount of the air sucked into the air cleaner 40 is installed in the vicinity of the air cleaner 40.

The compressor 50, which is a portion of a turbocharger, compresses the filtered intake air supplied through the air cleaner 40. In this connection, the turbocharger includes a turbine rotating by exhaust gas discharged from the engine, and the compressor 50 for compressing the intake air rotated by the turbine and supplied to the engine.

The inter cooler 60 is an apparatus for cooling the compressed air of a high temperature, which is compressed by the compressor 50. That is, the inter cooler 60 cools the intake air compressed by the compressor 50 to increases an air density. The electronic throttle control 70 regulates the amount of intake air supplied to the engine.

An opening degree of the electronic throttle control 70 is controlled by the processor 170 to be described later. A boost sensor 65 is installed on the intake line L5 connecting the inter cooler 60 and the electronic throttle control 70 with each other. The boost sensor 65 measures a boost pressure supplied by the compressor 50 to the intake manifold.

Figure 2:
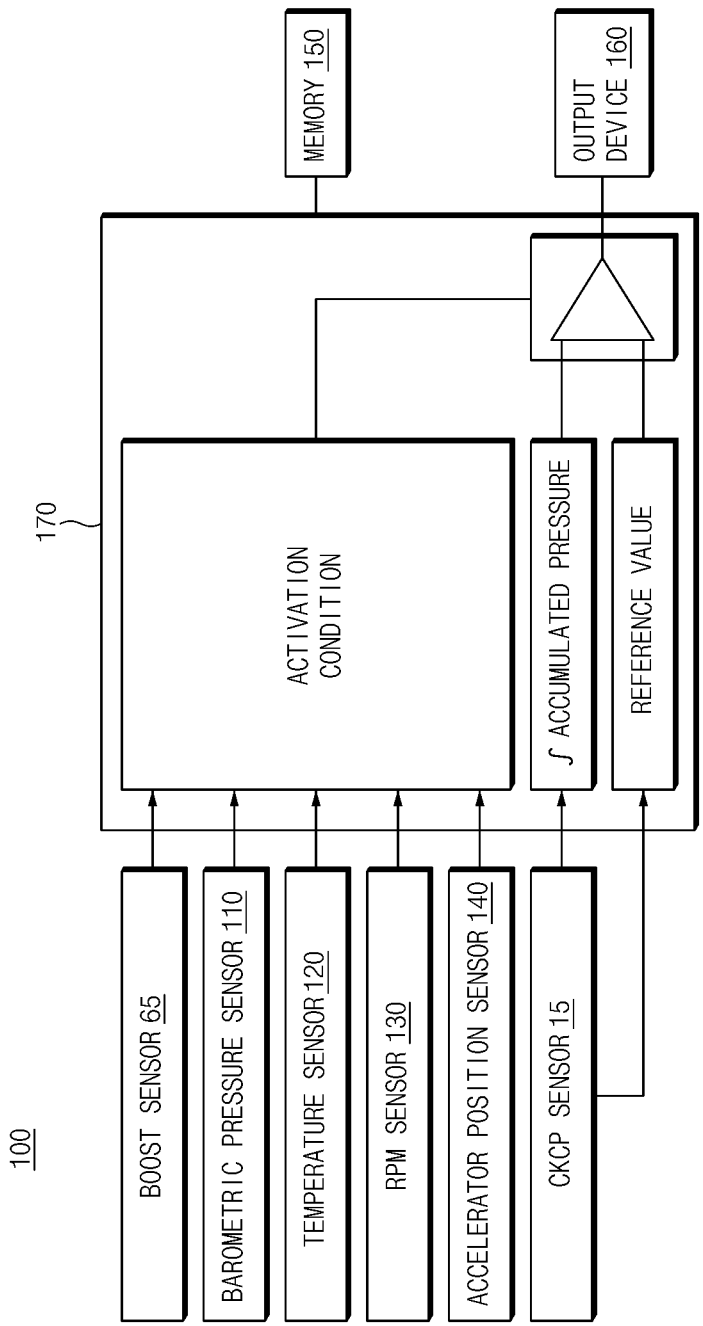
FIG. 2 is a block diagram illustrating a PCV breather line diagnosis device.

FIG. 2 is a block diagram illustrating a PCV breather line diagnosis device according to one form of the present disclosure.

Referring to FIG. 2, a PCV breather line diagnosis device 100 includes: the CKCP sensor 15, the boost sensor 65, a barometric pressure sensor 110, a temperature sensor 120, a revolution per minute (RPM) sensor 130, an accelerator position sensor (APS) 140, a memory 150, an output device 160, and the processor 170.

The CKCP sensor 15 detects a crankcase pressure (i.e., a pressure inside of the crankcase). The boost sensor 65 detects an intake manifold pressure, that is, the boost pressure.

The barometric pressure sensor 110 is attached to the air flow sensor to measure (detect) a barometric pressure (an atmospheric pressure).

The temperature sensor 120 may measure an intake air temperature, a cooling water temperature, and the like. That is, the temperature sensor 120 may include an air temperature sensor (air temperature sensor), a water temperature sensor (WTS), and the like. The air temperature sensor, which is attached to the air flow sensor (AFS) installed in the vicinity of the air cleaner 40 to detect a temperature of the intake air, may be implemented as a thermistor. The water temperature sensor is installed in a cooling water passage of the intake manifold to measure a temperature of engine cooling water. As the water temperature sensor, a bimetal, a thermistor, and the like are used.

The RPM sensor 130 measures revolutions per minute (RPM) of the engine. The accelerator position sensor 140 measures a position of an accelerator pedal, that is, a degree of stepping on the accelerator pedal.

The memory 150 stores a program for an operation of the processor 170. The memory 150 may temporarily store input data and/or output data of the processor 170. The memory 150 may be implemented as at least one storage medium (recording medium) of a flash memory, a hard disk, a secure digital card (SD card), a random access memory (RAM), a static random access memory (SRAM), a read only memory (ROM), a programmable read only memory (PROM), an electrically erasable and programmable ROM (EEPROM), an erasable and programmable ROM (EPROM), a resistor, and the like.

The output device 160 outputs a progress and/or a result based on the operation of the processor 170 as visual information, auditory information, and/or tactile information, and the like. The output device 160 may output a PCV breather line diagnosis result based on an instruction of the processor 170. The output device 160 may be implemented as a display, a speaker, and/or a vibrator, or the like.

The processor 170 controls an overall operation of the PCV breather line diagnosis device 100. The processor 170 may be implemented as at least one of an application specific integrated circuit (ASIC), a digital signal processor (DSP), a programmable logic device (PLD), field programmable gate arrays (FPGAs), a central processing unit (CPU), microcontrollers, and microprocessors.

The processor 170 detects an initial CKC pressure (a CKC pressure before starting) through the CKCP sensor 15 when power is supplied to a vehicle. Thereafter, when the engine starts, the processor 170 determines to activate a breather line diagnosis mode based on the boost pressure, the barometric pressure, the cooling water temperature, an engine state, and/or an accelerator pedal position change rate. Specifically, the processor 170 detects the boost pressure, the barometric pressure, the cooling water temperature, and the engine state respectively through the boost sensor 65, the barometric pressure sensor 110, the temperature sensor 120, and the RPM sensor 130. The processor 170 may determine to activate a breather line rear end diagnosis mode or to activate a breather line front end diagnosis mode based on the boost pressure, the barometric pressure, the cooling water temperature, and the engine state. For example, when the boost pressure is equal to or less than 1 atmosphere, the barometric pressure is equal to or less than 1 atmosphere, and the cooling water temperature is equal to or greater than −7 degrees, and the engine is cranking, the processor 170 determines to activate a breather line L2 rear end diagnosis mode (hereinafter, referred to as activation of the rear end diagnosis mode). On the other hand, when the boost pressure is equal to or less than 1 atmosphere, the barometric pressure is equal to or less than 1 atmosphere, and the cooling water temperature is equal to or greater than −7 degrees, and the engine is running, the processor 170 determines to activation of a breather line L2 front end diagnosis mode (hereinafter, referred to as activate the front end diagnosis mode).

When it is determined to activate the rear end diagnosis mode, the processor 170 starts a diagnosis of the rear end of the breather line L2. The processor 170 calculates a negative pressure accumulated value and/or a positive pressure accumulated value of the crankcase 10 based on the crankcase (hereinafter, referred to as the CKC) pressure measured (detected) by the CKCP sensor 15. When the initial CKC pressure is a negative number, the processor 170 detects a current CKC pressure (hereinafter, referred to as the CKC pressure) through the CKCP sensor 15, and adds the detected current CKC pressure to a previous negative pressure accumulated value CKC_neg(old) to calculate a current negative pressure accumulated value CKC_neg(new). On the other hand, when the initial CKC pressure is a positive number, the processor 170 detects the CKC pressure through the CKCP sensor 15, and adds the CKC pressure to a previous positive pressure accumulated value CKC_pos(old) to calculate a current positive pressure accumulated value CKC_pos(new).

The processor 170 compares the calculated current positive pressure accumulated value with the calculated current negative pressure accumulated value to determine whether a negative pressure is formed. The processor 170 determines that the rear end of the breather line L2 is normal when the negative pressure is formed, and determines that the rear end of the breather line L2 is abnormal when the negative pressure is not formed. Specifically, the processor 170 adds the current positive pressure accumulated value and the current negative pressure accumulated value to calculate a current pressure accumulated value CKC_P of the CKC. The processor 170 determines that the rear end of the breather line L2 is normal when the current pressure accumulated value CKC_P is less than a reference accumulated value (e.g., −0.15). On the other hand, the processor 170 determines that the rear end of the breather line L2 is abnormal when the current pressure accumulated value CKC_P is equal to or greater than the reference accumulated value.

When it is determined to activate the front end diagnosis mode after the abnormality diagnosis of the rear end of the breather line L2 is completed, the processor 170 initiates a diagnosis of the front end of the breather line L2. After activating the front end diagnosis mode, the processor 170 detects the accelerator pedal position change rate using the accelerator position sensor 140 to determine whether the accelerator pedal position change rate is equal to or greater than a reference change rate (e.g., 5%/sec). When the vehicle is in a transition section in which the accelerator pedal position change rate is equal to or greater than the reference change rate, the processor 170 determines whether the initial CKC pressure is the negative number. When the initial CKC pressure is the negative number, the processor 170 calculates a current negative pressure accumulated value CKC2_neg (new) based on the CKC pressure measured by the CKCP sensor 15. That is, the processor 170 adds the CKC pressure measured by the CKC sensor 15 to a previous negative pressure accumulated value CKC2_neg(old) to obtain a current negative pressure accumulated value.

The processor 170 determines the current negative pressure accumulated value as a current pressure accumulated value CKC_P2, and determines whether a ratio of the current pressure accumulated value to a reference value is equal to or below a reference ratio. In this connection, the reference value is determined in advance based on result data of a test using a vehicle with a normal PCV breather line. When the ratio of the current pressure accumulated value to the reference value is below the reference ratio, the processor 170 determines that the front end of the breather line L2 is abnormal. When the ratio of the current pressure accumulated value to the reference value is above the reference ratio, the processor 170 determines that the front end of the breather line L2 is normal. In other words, the processor 170 diagnoses the abnormality of the front end of the breather line L2 based on an accumulated value of a change in a pressure of the breather line L2 in an acceleration/deceleration section, that is, the transition section.

Figure 3:
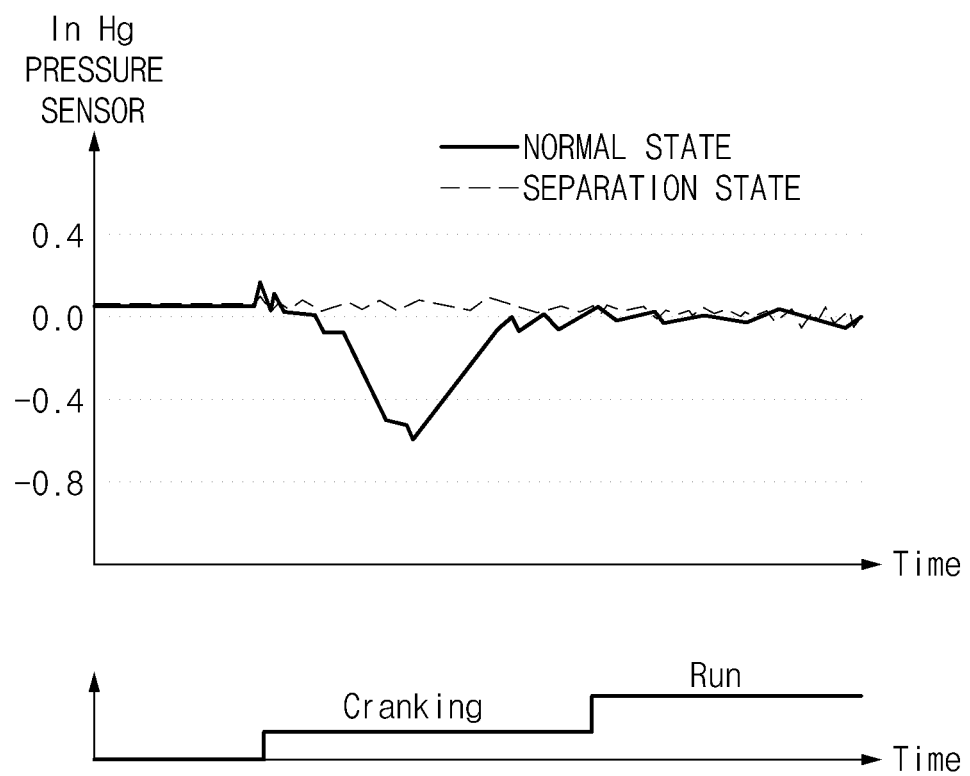
FIG. 3 is a graph showing abnormal and normal states of a rear end of a breather line.
Figure 4:
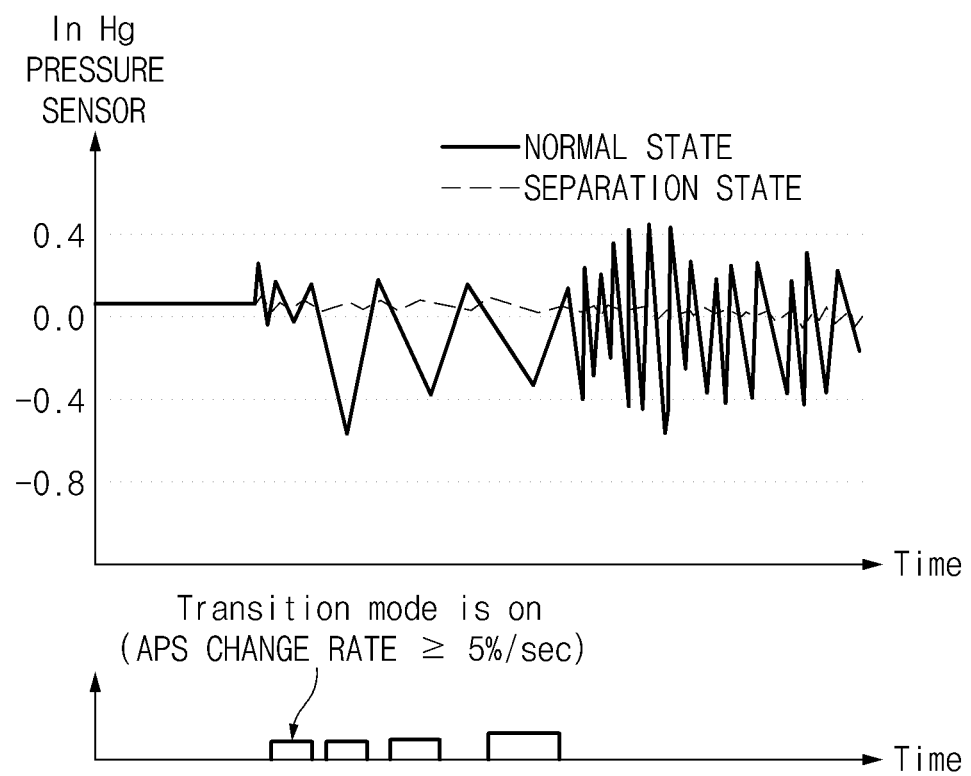
FIG. 4 is a graph showing abnormal and normal states of a front end of a breather line.

FIG. 3 is a graph showing abnormal and normal states of a rear end of a breather line associated with the present disclosure, and FIG. 4 is a graph showing abnormal and normal states of a front end of a breather line associated with the present disclosure.

Referring to FIG. 3, when the rear end of the breather line is normally connected to the crankcase 10 in the cranking state of the engine, the negative pressure is formed on the breather line, but when the rear end of the breather line is separated, the negative pressure is not formed on the breather line.

Referring to FIG. 4, while the engine is running, the negative pressure is famed in the transition section in which the accelerator pedal position change rate is equal to or greater than 5%/sec, and the negative pressure is not formed in a section in which the accelerator pedal position change rate is less than 5%/sec.

In consideration of features shown in FIGS. 3 and 4, the PCV breather line diagnosis device 100 shown in FIG. 2 determines whether the negative pressure is formed on the breather line when starting the vehicle to diagnose an abnormality because of the separation of the rear end of the breather line. In addition, the PCV breather line diagnosis device 100 diagnoses an abnormality of separation of the front end of the breather line using the accumulated value of the change in the pressure of the breather line in a section in which the pressure is applied in the acceleration/deceleration section while traveling.

Figure 5:
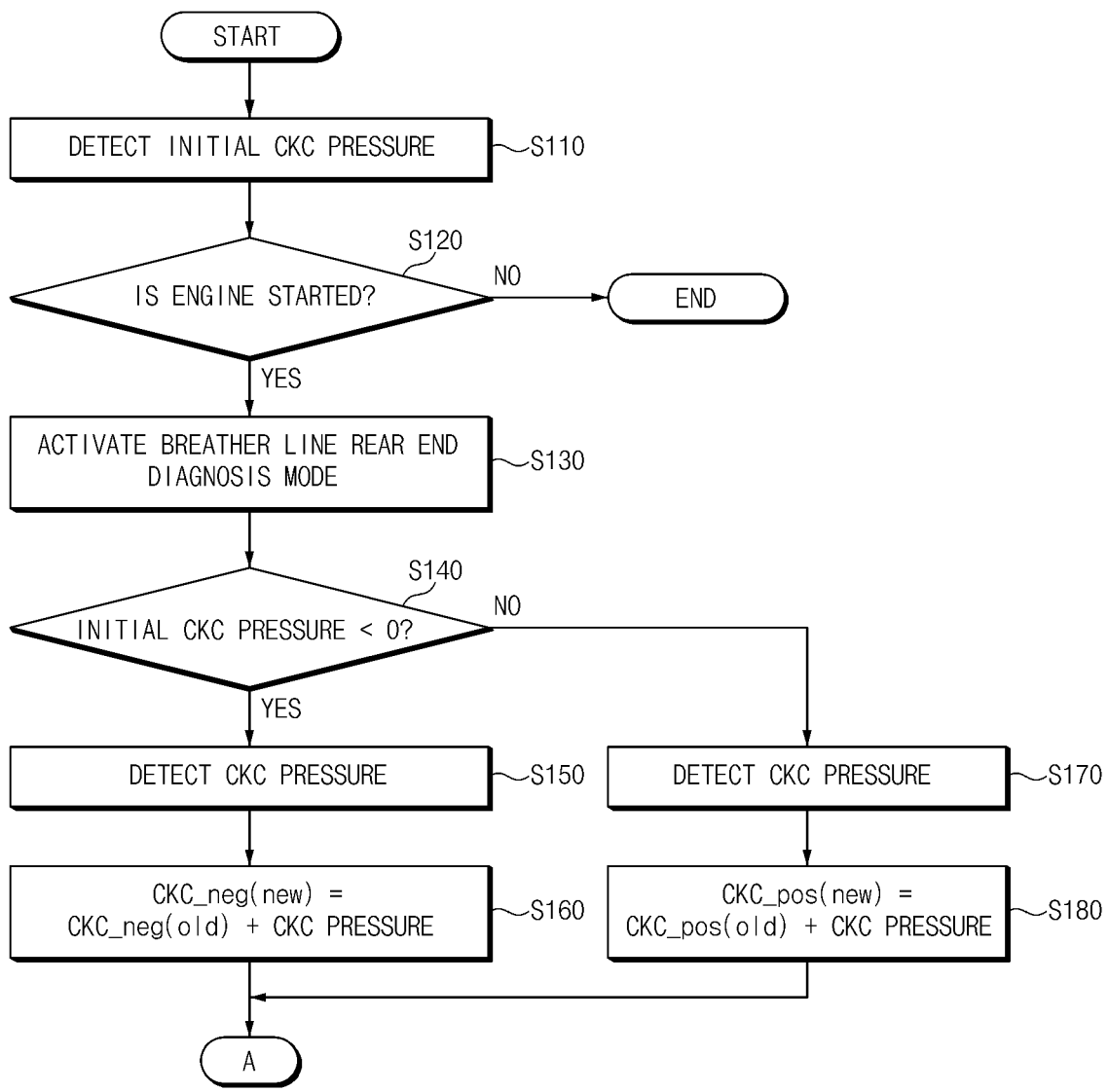
FIGS. 5 to 7 are flowcharts respectively illustrating a PCV breather line diagnosis method.
Figure 6:
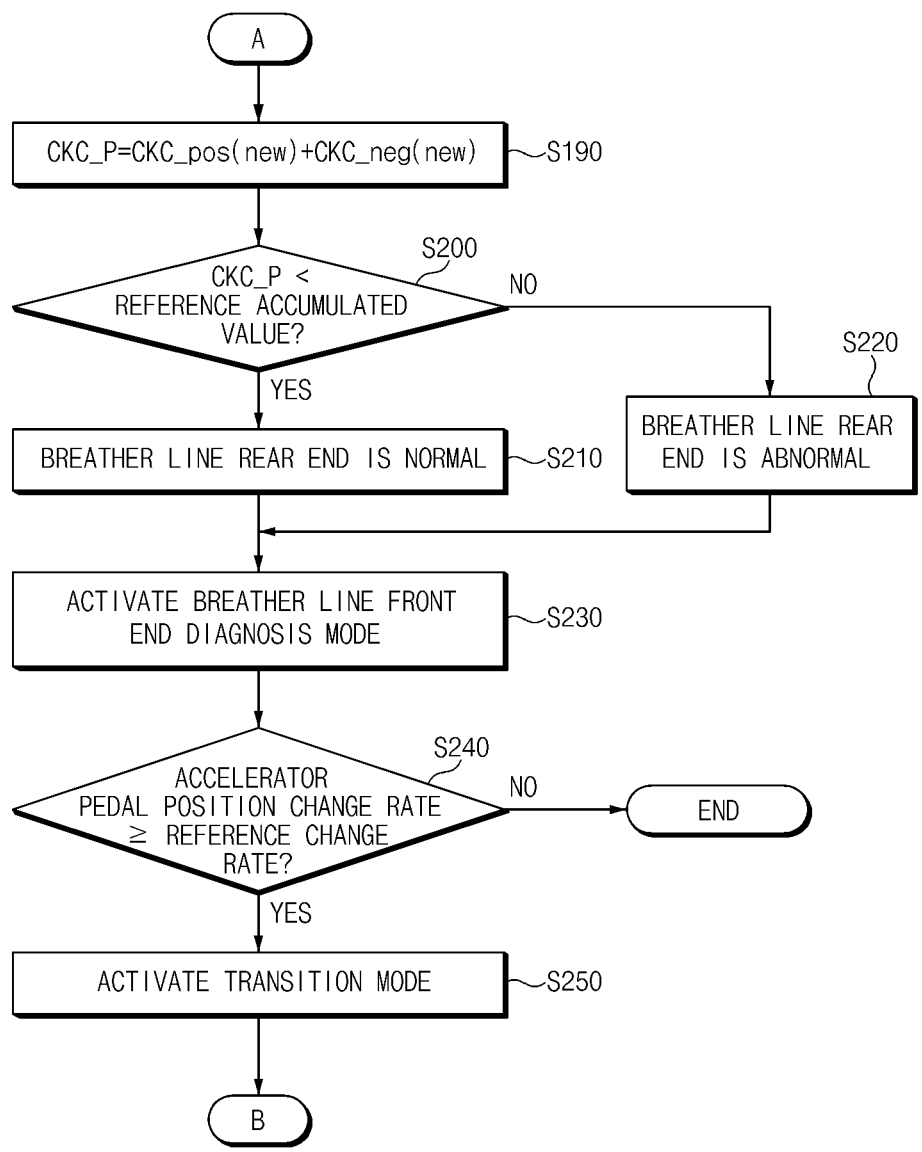
Figure 7:
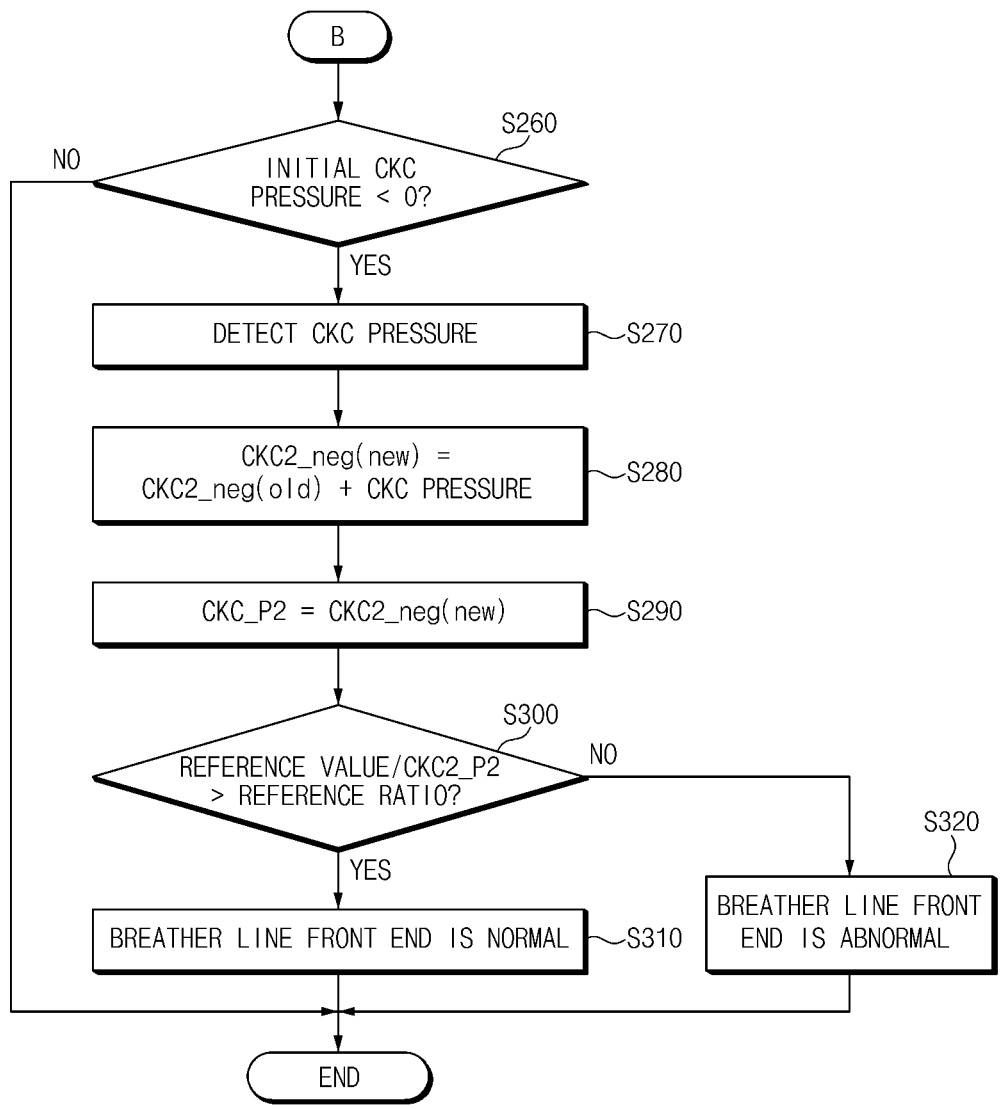

FIGS. 5 to 7 are flowcharts illustrating a PCV breather line diagnosis method according to another form of the present disclosure.

First, the processor 170 detects the initial CKC pressure through the CKCP sensor 15 when the power is supplied to the vehicle (S110). The processor 170 measures the CKC pressure before the starting.

The processor 170 determines whether the engine is started (S120).

When the engine is started, the processor 170 determines to activate the breather line rear end diagnosis mode in consideration of a vehicle state (S130). The processor 170 determines whether to activate the breather line rear end diagnosis mode based on the boost pressure, the barometric pressure, the cooling water temperature, and the engine state respectively obtained through the boost sensor 35, the barometric pressure sensor 110, the temperature sensor 120, and the RPM sensor 130. When the boost pressure is equal to or less than 1 atmosphere, the barometric pressure is equal to or less than 1 atmosphere, and the cooling water temperature is equal to or greater than −7 degrees, and the engine is in cranking, the processor 170 determines to activate the breather line rear end diagnosis mode.

The processor 170 determines whether the initial CKC pressure is the negative number after activating the breather line rear end diagnosis mode (S140). When the initial CKC pressure is the negative number, the processor 170 detects a CKC pressure CKC_neg(current) using the CKCP sensor 15 (S150). The processor 170 adds the detected CKC pressure CKC_neg(current) to the previous negative pressure accumulated value CKC_neg(old) to calculate the current negative pressure accumulated value CKC_neg(new) (S160). On the other hand, when the initial CKC pressure is not the negative number, the processor 170 detects the CKC pressure CKC_pos(current) using the CKCP sensor 15 (S170), and adds the detected CKC pressure CKC_pos(current) to the previous positive pressure accumulated value CKC_pos(old) to calculate the current positive pressure accumulated value CKC_pos(new) (S180).

The processor 170 calculates the current CKC pressure accumulated value CKC_P using the current negative pressure accumulated value CKC_neg(new) and the current positive pressure accumulated value CKC_pos(new) (S190). That is, the processor 170 obtains the current CKC pressure accumulated value CKC_P through an addition operation of the current negative pressure accumulated value CKC_neg(new) and the current positive pressure accumulated value CKC_pos(new).

The processor 170 determines whether the current CKC pressure accumulated value CKC_P is less than the reference accumulated value (e.g., −0.15) (S200). When the current CKC pressure accumulated value CKC_P is less than the reference accumulated value, the processor 170 determines that the negative pressure is formed on the breather line L2. When the current CKC pressure accumulated value CKC_P is equal to or greater than the reference accumulated value, the processor 170 determines that the negative pressure is not formed on the breather line L2. The processor 170 determines that the rear end of the breather line L2 is normal when the current CKC pressure accumulated value CKC_P is less than the reference accumulated value (S210). On the other hand, the processor 170 determines that the rear end of the breather line L2 is abnormal when the current CKC pressure accumulated value CKC_P is equal to or greater than the reference accumulated value (S220).

When the diagnosis of the rear end of the breather line L2 is complete, the processor 170 determines to activate the breather line front end diagnosis mode in consideration of the vehicle condition (S230). The processor 170 detects the boost pressure, the barometric pressure, the cooling water temperature, and the engine state respectively obtained through the boost sensor 35, the barometric pressure sensor 110, the temperature sensor 120, and the RPM sensor 130. When the boost pressure is equal to or less than 1 atmosphere, the barometric pressure is equal to less than 1 atmosphere, the cooling water temperature is equal to or greater than −7 degrees, and the engine is running, the processor 170 determines to activate the breather line front end diagnosis mode.

When the breather line front end diagnosis mode is activated, the processor 170 determines whether the accelerator pedal position change rate (APS change rate) is equal to or greater than the reference change rate through the APS 140 (S240). When the accelerator pedal position change rate is equal to or greater than the reference change rate, the processor 170 activates a transition mode (S250).

The processor 170 determines whether the initial CKC pressure is the negative number (S260). When the initial CKC pressure is the negative number, the processor 170 detects the CKC pressure CKC2_neg(current) through the CKCP sensor 15 (S270). The processor 170 adds the detected CKC pressure CKC2_neg(current) to the previous negative pressure accumulated value CKC2_neg(old) to calculate the current negative pressure accumulated value CKC2_neg(new) (S280). The processor 170 determines the calculated current negative pressure accumulated value CKC2_neg(new) as the current CKC pressure accumulated value CKC_P2 (S290).

The processor 170 determines whether the ratio of the current CKC pressure accumulated value CKC_P2 to the reference value exceeds the reference ratio (S300). When the ratio of the current CKC pressure accumulated value CKC_P2 to the reference value exceeds the reference ratio, the processor 170 determines that the front end of the breather line L2 is normal (S310). On the other hand, when the ratio of the current CKC pressure accumulated value CKC_P2 to the reference value does not exceed the reference ratio, the processor 170 determines that the front end of the breather line L2 is abnormal (S320).

The description above is merely illustrative of the technical idea of the present disclosure, and various modifications and changes may be made by those skilled in the art without departing from the essential characteristics of the present disclosure. Therefore, the exemplary forms of the present disclosure are provided to explain the spirit and scope of the present disclosure, but not to limit them, so that the spirit and scope of the present disclosure is not limited by the exemplary forms. The scope of the present disclosure should be construed on the basis of the accompanying claims, and all the technical ideas within the scope equivalent to the claims should be included in the scope of the present disclosure.

According to the present disclosure, the crankcase pressure sensor is added to the positive crankcase ventilation (PCV) breather line, so that the abnormality of the connection portion of the breather line connected to the intake line and the head cover is diagnosed.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A device for diagnosing a positive crankcase ventilation (PCV) breather line, the device comprising:
    a crankcase pressure sensor installed on the PCV breather line including a front end connected to an intake line and a rear end connected to a crankcase and configured to detect a pressure inside of the crankcase; and
    a processor configured to:
        determine whether to activate a diagnosis mode based on a boost pressure, a cooling water temperature, a barometric pressure, and an engine state, and
        diagnose an abnormality of the PCV breather line based on the detected pressure of the crankcase in the diagnosis mode.

2. The device of claim 1, wherein the processor is configured to activate the diagnosis mode of the rear end of the PCV breather line when the engine state is a cranking state.

3. The device of claim 2, wherein the processor is configured to:
    calculate a negative pressure accumulated value and a positive pressure accumulated value of the crankcase based on the detected pressure of the crankcase and compare the negative and positive pressure accumulated values with each other; and
    determine that the rear end of the PCV breather line is abnormal when a negative pressure is not formed as a result of the comparison.

4. The device of claim 1, wherein the processor is configured to activate the diagnosis mode of the front end of the PCV breather line when the engine state is a running state.

5. The device of claim 4, wherein the processor is configured to:
    calculate a current negative pressure accumulated value of the crankcase based on the detected pressure of the crankcase when an accelerator pedal position change rate is equal to or greater than a reference change rate; and
    determine that the front end of the PCV breather line is abnormal when a ratio of the current negative pressure accumulated value to a predetermined reference value is equal to or less than a reference ratio.

6. A method for diagnosing a positive crankcase ventilation (PCV) breather line by a device for diagnosing the PCV breather line, where the device include: a pressure sensor installed on the PCV breather line having a front end connected to an intake line and a rear end connected to a crankcase, and a processor to diagnose the PCV breather line, the method comprising:
    determining, by the processor, whether to activate a diagnosis mode based on a boost pressure, a cooling water temperature, a barometric pressure, and an engine state;
    detecting, by the pressure sensor, a pressure inside of the crankcase in the diagnosis mode; and
    diagnosing, by the processor, an abnormality of the PCV breather line based on the detected pressure of the crankcase.

7. The method of claim 6, wherein determining whether to activate the diagnosis mode includes:
    activating the diagnosis mode of a rear end of the PCV breather line when the engine state is a cranking state.

8. The method of claim 7, wherein diagnosing the abnormality of the PCV breather line includes:
    calculating a negative pressure accumulated value and a positive pressure accumulated value of the crankcase based on the detected pressure of the crankcase after the diagnosis mode of rear end is activated;
    comparing the negative and positive pressure accumulated values with each other to determine whether a negative pressure is formed on the PCV breather line; and
    determining whether the rear end of the PCV breather line is abnormal based on the negative pressure formed on the PCV breather line.

9. The method of claim 8, wherein determining whether the rear end of the PCV breather line is abnormal includes:
    determining that the rear end of the PCV breather line is abnormal when the negative pressure is not formed.

10. The method of claim 6, wherein determining whether to activate the diagnosis mode includes:
    activating the diagnosis mode of a front end of the PCV breather line when the engine state is a running state.

11. The method of claim 10, wherein diagnosing the abnormality of the PCV breather line includes:

calculating a current negative pressure accumulated value of the crankcase based on the detected pressure of the crankcase when an accelerator pedal position change rate is equal to or greater than a reference change rate; and
determining whether a ratio of the current negative pressure accumulated value to a predetermined reference value is equal to or less than a reference ratio to determine whether the front end of the PCV breather line is abnormal.

12. The method of claim 11, further comprising:
determining that the front end of the breather line is abnormal when the ratio of the current negative pressure accumulated value to the predetermined reference value is equal to or less than the reference ratio.

* * * * *